United States Patent [19]

Dickey et al.

[11] Patent Number: 4,571,994

[45] Date of Patent: Feb. 25, 1986

[54] ACOUSTICAL TESTING OF HYDRAULIC ACTUATORS

[75] Inventors: Joseph W. Dickey; Lloyd E. Powell, both of Annapolis, Md.

[73] Assignee: The United States of America as represented by the Secretary of the Navy, Washington, D.C.

[21] Appl. No.: 638,148

[22] Filed: Aug. 6, 1984

[51] Int. Cl.[4] .............................................. G01M 3/24
[52] U.S. Cl. .................................... 73/168; 73/40.5 A
[58] Field of Search ..................... 73/47, 40.5 A, 658, 73/661, 168, 592, 593

[56] References Cited

U.S. PATENT DOCUMENTS

| | | | |
|---|---|---|---|
| 3,098,382 | 7/1963 | Hoffman et al. | 73/168 |
| 3,223,194 | 12/1965 | Michael . | |
| 3,409,897 | 11/1968 | Bosselaar et al. | 73/40.5 A |
| 3,413,653 | 11/1968 | Wood . | |
| 3,508,433 | 4/1970 | Bustin | 73/40.5 A |
| 3,561,256 | 2/1971 | Bustin et al. | 73/40.5 A |
| 3,626,750 | 12/1971 | Talmon | 73/40.5 A |
| 3,838,593 | 10/1974 | Thompson | 73/40.5 A |
| 3,903,729 | 9/1975 | Covington | 73/40.5 R |
| 3,930,556 | 1/1976 | Kusuda | 73/40.5 A |
| 4,075,601 | 2/1978 | Flournoy | 73/40.5 A |
| 4,083,229 | 4/1978 | Anway | 73/40.5 A |
| 4,181,017 | 1/1980 | Markle | 73/168 |
| 4,289,019 | 9/1981 | Claytor | 73/40.5 A |
| 4,327,576 | 5/1982 | Dickey et al. | 73/40.5 A |

FOREIGN PATENT DOCUMENTS 2498325  7/1982  France ................................. 73/592

*Primary Examiner*—Stewart J. Levy
*Assistant Examiner*—Hezron E. Williams
*Attorney, Agent, or Firm*—Robert F. Beers; Luther A. Marsh; Roger L. Maxwell

[57] ABSTRACT

A device for testing hydraulic actuators using acoustical transducers to sense sound sources indicative of leaks or other defects in the actuator. A graph of acoustic signals versus piston location may be determined using one acoustic transducer and one position sensor. A correlation function may be obtained by cross-correlating the output from two spaced acoustic transducers.

3 Claims, 4 Drawing Figures

ACOUSTICAL TESTING OF HYDRAULIC ACTUATORS

BACKGROUND OF THE INVENTION

1. Field of the Invention

This invention relates to the testing of hydraulic actuation devices and more specifically to an acoustical testing apparatus to detect leakage and other problems in hydraulic actuators.

2. Description of the Prior Art

The hydraulic actuating rams used in many applications involving machinery are susceptible to a number of malfunctions or failures from different causes. For example, hydraulic fluid may leak around the seal between the piston and cylinder wall, the way may be worn, pitted from corrosion or scratched, or fluid may leak past actuator rod seals.

The technically simplest method to test a ram suspected of malfunction is to remove it from the system and take it apart to visually inspect and measure the condition of the parts of the actuator. This is, of course, costly and renders the system inoperable. It also requires exacting measurements to determine wear patterns and subjects the parts to possible damage during disassembly and assembly.

One better testing procedure is to immobilize the tailpiece of the actuator by bringing it up against an immovable object and allow hydraulic fluid to enter through one valve. Any fluid leaving the other valve is due to leakage. Similarly, the piston may be brought up to one end of the cylinder and the same procedure followed. However, this procedure may only be used at those positions where it is convenient to stop the travel of the ram and requires opening the system downstream of the ram to observe the fluid leakage. Thus, this technique requires partial disassembly and the possibility of missing a problem area completely.

SUMMARY OF THE INVENTION

The present invention overcomes the problems experienced with prior art devices by utilizing acoustic transducers to pick up acoustic emissions caused by leaks and other malfunctions. The signature of the emission may be examined by plotting the acoustic emission against the travel distance of the piston. Alternatively, the signal from an acoustic transducer at one end of the actuator may be delayed according to the position of the piston and multiplied with the signal from the transducer at the other end. Another method of examination is by cross-correlating the signals from the transducers at each end. The results of these examinations will indicate the location of the defect and also classify the type of defect.

Accordingly, it is an object of this invention to provide a non intrusive, accurate hydraulic actuator testing device using acoustic transducers.

It is another object of the invention to provide a device for accurately determining the location of defects in hydraulic actuators.

A further object of the invention is to provide an acoustical testing device that quickly and reliably locates fluid leaks and other defects in hydraulic actuators.

A still further object of the invention is to provide an electronic testing device with an acoustic input which is simple, compact, efficient and reliable, and which is able to accurately locate and determine the type of defects in hydraulic actuators.

BRIEF DESCRIPTION OF THE DRAWINGS

A more complete appreciation of the invention and many of the attendant advantages thereof will be readily appreciated as the same becomes better understood by reference to the following detailed description when considered in connection with the accompanying drawings wherein.

DETAILED DESCRIPTION OF THE PREFERRED EMBODIMENTS

Figure 1:
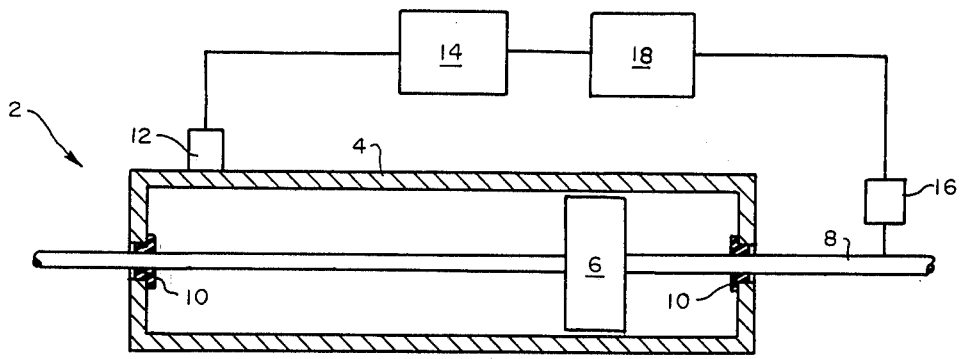
FIG. 1 shows a schematic of a first embodiment of the present invention.

Referring now to the drawings wherein like reference characters designate identical or corresponding parts throughout the several views and more particularly to FIG. 1 wherein a first embodiment of the present invention is shown as including a hydraulic actuator device, indicated generally as 2. The device includes a cylinder 4 having an opening in each end. A piston 6 travels within cylinder 4 and sealingly engages the sidewalls of the cylinder. The actuator tailpiece 8 extends in opposite directions from the piston through the ends of the cylinder. A seal 10 is placed in the openings in each end and around the tailpiece to prevent leakage of hydraulic fluid.

Figure 2:
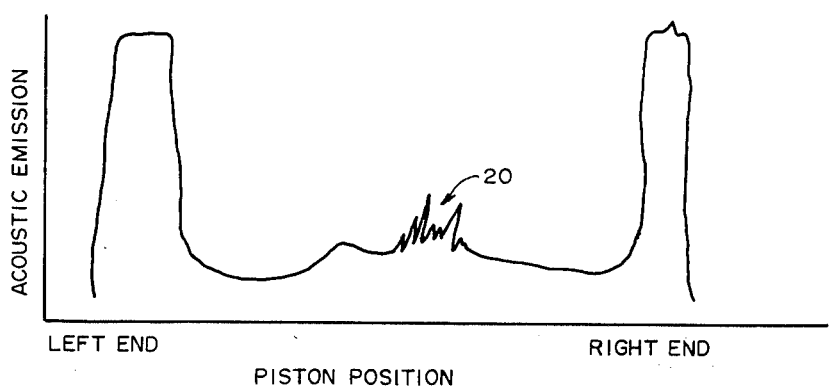
FIG. 2 shows a graph of the type obtained from the plotter in the first embodiment shown in FIG. 1.

An acoustic transducer 12 is placed near one end of the cylinder and in contact with the wall of the cylinder so as to pick up any sounds within the cylinder. The electrical output signal of the transducer is sent to amplifier and filter device 14 to amplify the signal and filter out extraneous noise. The output of this device is then sent to a first input of the X-Y plotter 18. At the same time, position transducer 16 senses the position of the tailpiece and hence also the position of the piston. This transducer produces an electrical signal indication of this position and sends the signal to a second input of X-Y plotter 18. The X-Y plotter produces a graph of acoustic emission as a function of piston position as shown in FIG. 2.

Figure 3:
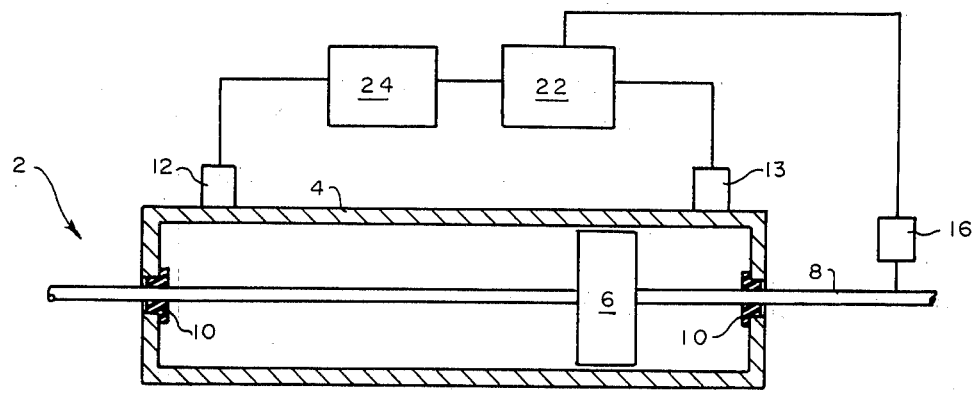
FIG. 3 shows a schematic of a second embodiment of the present invention.

A second embodiment is shown in FIG. 3 where a second acoustic transducer 13 is placed near the other end of the cylinder. The output of each transducer may be sent to an amplifier and filter just as in the first embodiment, but are not shown here. In either case, the output from one end is sent to multiplier 24 directly while the output from the other end is sent to the multiplier after being delayed in variable delay device 22. The amount of the delay is determined by a position signal from position transducer 16.

Figure 4:
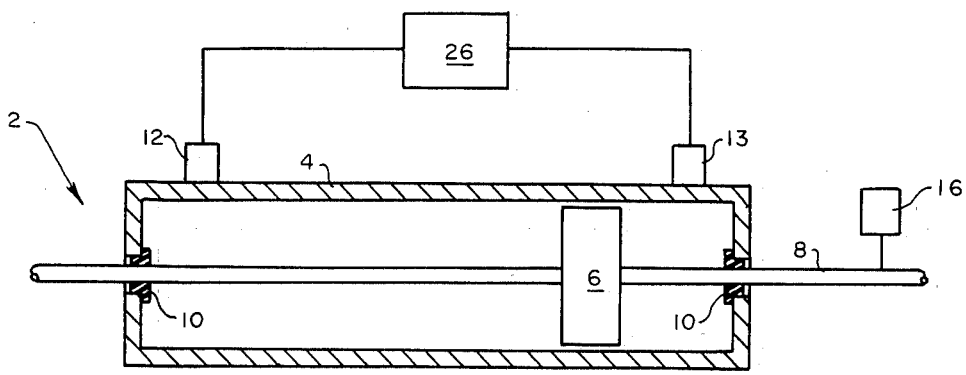
FIG. 4 shows a schematic of a third embodiment of the present invention.

The third embodiment, shown in FIG. 4 uses two acoustic transducers, as in FIG. 3, but the outputs are both sent to cross-correlator 26. The output of the transducer may also be sent to an amplifier and filter first, if desired.

In operation, as the piston in FIG. 1 moves back and forth in the cylinder, various noises are produced by the fluid or by the piston itself. For example, fluid leaking past an obstacle from a high to a lower pressure emits acoustic energy over a wide frequency range with the amplitude and temporal characteristics being related to the amount of fluid leakage in a way which allows for a measurement of the leakage rate. Also, when the piston slides over an area where the cylinder wall is corroded or scratched, it emits acoustic energy. Fluid leaking past seals 10 also generates an acoustic emission. In general, these types of acoustic sources are distinguishable from each other and from external noise.

No matter what the source of the acoustical signal, the acoustical transducer 12, which may be a simple microphone device, picks up the sound and changes it into an electrical signal. After being amplified and filtered, it becomes the Y input in an X-Y plotter 18. At the same time, position transducer 16 senses the position of tailpiece 8 and hence the piston 6 and converts it to an electrical signal which becomes the X input to the plotter. Based on these two inputs, the plotter produces a graph of the acoustic emission versus the position of the piston, as shown in FIG. 2.

The graph obtained is a "signature" of the device and can be used to determine the position of a defect and characterize its type. However, it is best to obtain a signature of the piston moving both left and right since not all defects produce an identical signature in both directions. This is due to the fact that only one of the seals 10 is holding the pressuring during the movement. Also, cylindrical wall defects act differently when the piston moves from different directions. However, they are still distinguishable from seal leaks and external leaks.

Defects in the piston half of the piston/cylinder seal usually have an abnormally high acoustic emission level during piston travel, but are most easily detected by the presence of an emission when the ram is stopped or moving very slowly under load.

Another type of sound is produced when hydraulic fluids cavitate as they undergo sudden decompression when leaking from a high to low pressure environment. This noise is easily identified even in the presence of other sounds and can be used to distinguish between fluid leaking past the piston and scraping noise generated when the piston passes over a defect in the wall. This type of sound is shown as 20 in FIG. 2.

By examining the signature of the sound, it is possible to locate defects by their X coordinate on the graph and characterize the type of defect by the particular shape of the curves at that point. The amplitude also generally indicates the severity of the defect. Thus, the general condition of the actuator and diagnostic testing can be determined without taking the device apart.

Another embodiment of the invention is shown in FIG. 3 and uses two acoustic transducers as well as a position sensor. An acoustic source emanating from the defect, sends sound through the cylinder until it reaches each of the transducers. The transit time needed to reach each transducer depends on the position of the source with respect to that transducer and will be different for the two transducers. Accordingly, any source of sound caused by a localized imperfection will cause a signal to be received at each transducer which is similar, but offset in time by an amount equal to the difference in transit time needed to get to the two transducers. If these two signals were multiplied together, the product would be zero for all time since the peaks are offset in time. However, if one of the signals is delayed by the difference in transit time, the signals will be essentially coincident and multiplication of the signals will produce a large peak, indicating a defect. Since the difference in transit time is dependent on the distance to the source and hence the position of the piston, the amount of delay necessary to make the signals coincide may be determined by the position of the piston. Position sensor 16 senses the movement of the tailpiece and hence the position of the piston. Thus, a signal indicative of the position of the sensor will also indicate the amount of delay needed to make the signals coincident. By sending this signal to variable delay device 22, the signal from transducer 13 will be delayed the appropriate amount and multiplier 24 will multiply the two signals together to look for peaks.

Any source which originates from a point which does not follow the time difference criteria, such as extraneous noises, is largely ignored by the device since it concentrates noises which do follow this criteria. It is also possible to have a manually selectable time difference so that other non-moving signals, such as from seals 10 may be accepted.

The preferred embodiment of the invention is shown in FIG. 4. This embodiment makes use of modern electronics to make the device simple to assemble and operate. The signal from the two transducers are sent as inputs to an electronic correlator 26. The correlator acts to cross-correlate the signals from each end to give an output. If the source comes from a particular piston position, then the correlation will show a peak at a correlation time equal to the difference in transit times between the signal arriving at the two transducers. This significant correlator function will only exist when the piston passes that point and the correlation time will indicate the location of the defect. If the signal is due to leakage, wall roughness or a defective piston over the entire extent of piston travel, then the correlator function will change with piston movement. Leakage past the seals 10 or extraneous noise arriving through the tailpiece 8 will result in a correlation peak which does not move with the piston and whose position corresponds to one end of the cylinder.

Thus, by examining the output of the correlator, various aspects of actuator performance may be determined. The amplitude of the correlation function at the extremities would indicate shaft seal leakage. The average of the correlation function excluding the extremities would be an indicator of average cylinder wall and/or piston wear or roughness. Above average values correspond to local defects in the cylinder wall.

Other alternatives are also available under this invention, for example by using on other actuators, such as pneumatic devices. Similarly, with modification it may be used on various kinds of positive displacement pumps, meters and motors. More than two transducers could be used to better define the defect location. The transducers could also be mounted on the tailpieces rather than the cylinder walls. Obviously, numerous other modifications and variations of the present invention are possible in light of the above teachings. It is therefore to be understood that within the scope of the appended claims, the invention may be practiced otherwise than as specifically described herein.

What is claimed is:

1. A device for testing a hydraulic actuator, said actuator having a cylinder and a piston and a tailpiece, comprising:
    an acoustic transducer in contact with the cylinder wall of said actuator so as to sense any acoustic sources therein, and produce an output;

a position sensor in contact with the tailpiece of said actuator for sensing the position of said tailpiece and the position of the piston of said actuator and producing an output indicative of said position of said piston; and an X-Y plotter having two inputs connected to the output of said transducer and the output of said sensor and producing an output in the form of a graph showing the relation of acoustic emissions to piston position;

whereby the output of said plotter indicates whether any defects are present in said actuator, the location of said defects and the type of said defects.

2. A device for testing a hydraulic actuator, said actuator having a cylinder and a piston and a tailpiece, comprising:

a first acoustic transducer and a second acoustic transducer separated from each other and in contact with the cylinder wall of said actuator so as to sense any acoustic sources therein, each of said transducers producing an output;

a position sensor in contact with the tailpiece of said actuator for sensing the position of said actuator and producing an output indicative of said position of said piston;

a variable delay device having a first input connected to said output of said first acoustic transducer, and a second input connected to the output of said position sensor, said delay device delaying the signal at said first input by an amount of time according to said second input to produce an output; and a means for multiplying having a first input connected to the output of said delay device and a second input connected to the output of said second acoustic transducer, said means for multiplying producing an output which is the product of said first input and said second input;

whereby said output of said means for multiplying indicates whether any defects are present in said actuator, the location of said defects and the type of said defects.

3. A device for testing a hydraulic actuator, said actuator having a cylinder and a piston and a tailpiece, comprising:

at least two acoustic transducers spaced apart from each other and in contact with the cylinder wall of said actuator so as to sense any acoustic sources therein, each of said transducers producing an output; and a means for cross-correlation having a least two inputs, each connected to an output of one of said acoustic transducers and producing an output indicative of the difference in time of receipt of an acoustic signal by said acoustic transducers;

whereby the output of said means for cross-correlation indicates whether any defects are present in said actuator, the location of said defects and the type of said defects.

* * * * *